United States Patent [19]
Satloff

[11] Patent Number: 5,667,319
[45] Date of Patent: Sep. 16, 1997

[54] SIMPLIFIED COMPUTER KEYBOARD

[76] Inventor: James Satloff, 470 W. End Ave., Apt. 5B, New York, N.Y. 10024

[21] Appl. No.: 406,109

[22] Filed: Mar. 17, 1995

Related U.S. Application Data

[63] Continuation-in-part of Ser. No. 298,870, Aug. 31, 1994, abandoned.

[51] Int. Cl.$^6$ ........................................................ B41J 5/10
[52] U.S. Cl. ........................... 400/472; 400/491.3; 341/22
[58] Field of Search ................................... 400/472, 487, 400/491.3; 341/21, 22

[56] References Cited

U.S. PATENT DOCUMENTS

| | | | |
|---|---|---|---|
| 3,805,939 | 4/1974 | Ross | 197/19 |
| 4,158,130 | 6/1979 | Speraw et al. | 235/146 |
| 5,339,097 | 8/1994 | Grant | 400/489 |
| 5,424,728 | 6/1995 | Goldstein | 400/472 |
| 5,426,449 | 6/1995 | Danziger | 341/22 |
| 5,442,960 | 8/1995 | Kuhlenschmidt | 400/487 |
| 5,493,654 | 2/1996 | Gopher | 341/22 |

*Primary Examiner*—Edgar S. Burr
*Assistant Examiner*—Steven S. Kelley
*Attorney, Agent, or Firm*—Furgang & Milde, LLP

[57] ABSTRACT

A simplified keyboard arrangement for use by a child. The simplified keyboard arrangement has a matrix of keys which are so situated to facilitate interaction between the child and a device, such as a computer. The simplified keyboard arrangement also develops motor skills of the child and encourages development of coordination. The simplified keyboard arrangement may be a self contained keyboard or an adapter provided for a standard-type keyboard. An adapter is also provided which allows connection of the simplified keyboard and a standard keyboard to a single keyboard port for simultaneous use of both keyboards.

27 Claims, 8 Drawing Sheets

SIMPLIFIED COMPUTER KEYBOARD

CROSS-REFERENCE TO RELATED APPLICATION

The present application for U.S. Patent is a continuation-in-part of U.S. patent application Ser. No. 08/298,870, filed Aug. 31, 1994 now abandoned, the entirety of which is expressly incorporated by reference.

FIELD OF THE INVENTION

The present invention relates to a simplified keyboard arrangement, especially for use by young children. The keyboard interfaces with a standard-type personal computer having a display, and is intended to be used interactively with software, preferably custom designed software, optimized for the simplified keyboard. The simplified keyboard may be used in conjunction with a standard keyboard, and with standard software.

BACKGROUND OF THE INVENTION

Keyboards are known for use with standard-type personal computers. A standard-type personal computer, as referred to in the present specification, refers to one which includes a central processing unit (CPU), most commonly an Intel 80X86 type, Motorola 680X0 type, a Power PC type, RISC (MIPS, SPARC, etc.) or other known processors. This processor communicates with a user feedback device, such as a display driver, which is generally a driver for a video display or a liquid crystal display. The display driver, in turn, causes an associated display to present a visual image to a user. The display may be a modular display or a display intimately associated with the computer. The processor may also communicate with an audio driver, which produces sound through an audio transducer. In some instances, an audio transducer may be the only user feedback mechanism present.

A standard-type personal computer also has a non-volatile mass storage system for storing a predetermined program for the CPU. This mass storage system may be ROM, EPROM, EEPROM, Flash memory, FRAM, battery-backed RAM, magnetic media, e.g., hard disk and/or floppy disk, optical media, e.g., CD-ROM, R-CD-ROM, magnetooptical media, or other data storage systems known in the art. The program stored in the mass storage system includes the basic input/output system (BIOS), and optionally a disk operating system (DOS) and application software. Application software may also be available by telecommunication link to a remote mass storage system.

Standard-type personal computers also include a human input device, such as a keyboard, joystick, mouse, voice and/or other type of device to receive an input from a human to be interpreted by the CPU as data to control its operation. Generally, manual input devices for computers comprise keyboards having a plurality of keys, arranged in a tight matrix, having associated linguistic symbols. These symbols, are generally letters and numbers, and as taught in the art, a keyboard should include access to a complete standard alphabet of symbols, plus functional symbols. Thus, the art teaches keyboards for standard-type personal computers having at least 28 keys, e.g. 26 letters, "space" and "enter", and possibly also punctuation, 10 number keys, 12 function keys, cursor movement keys, program control keys, etc. Further, these keyboards are generally arranged to approximate the spacing of adult fingers, with close gaps between keys sufficient to allow clearance without substantial interference. Often keyboards will have intelligence to convert key depressions to codes which are communicated to the CPU through a serial communication port.

A known device, the "Comfy Keyboard", provides a limited number of keys in a device which interfaces to a standard IBM-PC compatible computer through a Centronics-type printer port. This device requires special software loaded into the computer to determine key presses, and further operates only with custom written software to make use of the input. This custom software may be designed to ignore input from the standard keyboard which is simultaneously attached to the computer. The keys on the "Comfy Keyboard" are spaced apart, and the device intended for use by children. This device is not designed to, nor will it interface with a standard keyboard port.

"Programmable chip adds flexibility to input devices", *Electronic Products*, December, 1993, page 43–44, describes a semiconductor device, "Pilot EZ1000" by Rosetta Technologies, Inc., West Vancouver, B.C., which allows a serial input device, such as a standard IBM PC compatible personal computer keyboard, to be daisy chained with an additional input device with complex functionality. This device stores a configuration in a memory, such as a 93C46 1-Kbit serial EEPROM, and is therefore reconfigurable and programmable. This device allows separate press and release codes for up to eight inputs, and can pass codes unmodified or modified from the standard keyboard to the computer. This device is promoted for use embedded in input devices like digitizers and joysticks, as well as game controls. Separate function key devices, having a separate housing, are also known.

Computer products of Apple Computer Co., Cupertino, Calif., generally communicate with keyboards, mice, trackballs, and other input devices through the "Apple Desktop Bus" or ADB, which provides a daisy chainable serial connection for a number of devices. A number of keyboard variants are available for the ADB, which are generally suited for adult use.

The U.S. Pat. No. 5,250,930 to Yoshida et al. relates to a keyboard for a self-contained computer. The keyboard comprises a membrane keypad and a soft rubber dome keypad. The membrane keypad includes a 7×10 rectangular array of sensing areas under a graphic overlay. This system thus provides a high density input array with a large number of pressure sensitive areas. While apparently intended for use by children, the ergonomics are not optimized to allow young children or children with undeveloped coordination or limited capabilities to easily interact with the computer.

Auxiliary numeric keypads are also known for use with standard-type personal computers, as are programmable "function keyboards" having an array of one or two rows of keys, closely spaced, which may be programmed to add complex functionality (macros) to supplement the available functionality of a standard alphanumeric keyboard. Generally, these devices do not share input circuitry in the computer with the standard keyboard if they do not share the same housing, i.e., signals travel to the computer through separate ports.

Some time in 1994 there appeared on market a "Game Star™ Game Controller" manufactured by DynaPoint, Inc. of Fremont, Calif. This device has a cursor pointing device and six buttons arranged in a 2×3 array. It plugs directly into the keyboard connector of a personal computer while permitting simultaneous use of the for PC keyboard. The Game Star™ Game Controller is programmable in the sense that all of the game control buttons are configurable and the configurations can be saved and retrieved as templates. However, this device is intended for special use with Nintendo and Sega type games, not as a general purpose input device to provide symbolic data for use by the computer software.

SUMMARY AND OBJECTS OF THE INVENTION

The present invention relates to a simplified keyboard for use with a standard-type personal computer, having keys which are optimized in design, number and placement for use by young children, and which electrically interfaces to the computer in a manner similar to standard keyboards for manual entry of symbolic data for use by the computer software. A preferred design allows the simplified keyboard to be interfaced simultaneously with the alphanumeric keyboard, when desired, so that two persons, e.g., an adult and a child, may interact at the same time, and so that the simplified keyboard need not be disconnected and reconnected for alternate use of the computer.

The present simplified keyboard may thus be designed to share an input port on a standard computer with a standard keyboard without producing conflicting signals. Identification of input key may be accomplished by avoiding the unnecessary use of duplicate key codes on the standard keyboard and the simplified keyboard.

According to an alternative embodiment, the simplified keyboard may be present as a mechanical adapter which fits over the keys of a standard keyboard, such as an IBM PC-AT style 101 key keyboard. This adapter includes a simplified keyboard arrangement on an outer surface, and a mechanical linkage to transmit a manually applied force from the user to a corresponding key. In this way, the simplified keyboard arrangement may comprise a mechanical device without any necessary electrical connections.

As a mechanical adapter, the simplified keyboard arrangement may be detachably linked to the standard keyboard. Thus, the standard keyboard is available for use by an adult, whereas it may be covered by the adapter and thus protected during use by a child who has access only to the simplified keyboard manually operable elements. Of course, certain keys from the standard keyboard, such as function keys and cursor control keys, may remain visible and accessible while the simplified keyboard arrangement is attached.

The simplified keyboard arrangement according to the aforementioned alternative embodiment may be attached to the standard keyboard in any suitable manner. The preferred methods of attachment include a pair of rigid plastic endcaps which fit over the lateral aspects of the keyboard, which are displaceable centrally to close over the ends of the standard keyboard. The simplified keyboard may also be attached to the standard keyboard by a hook and loop fastener system, e.g., Velcro (R). Further, an elastic band extending from top to bottom around the back of the keyboard may be used to fix the simplified keyboard in place. The simplified keyboard may be positioned by relying on the standard spacing between various keys of most standard keyboards, such as the gap between the function keys and the top row of characters. Other known methods of providing a keyboard overlay may be applied to locate and affix the simplified keyboard arrangement to the standard keyboard.

The simplified keyboard arrangement, both as a stand-alone keyboard and an attachment for a standard keyboard, has a key spacing which is preferably greater than one quarter inch between keys, with each key having a size of between one half inch and two to three inches along its longest dimension. The keys are preferably arranged in a matrix array of two to three rows and three to six columns, although a non-matrix arrangement is also contemplated. The columns are preferably separated by a distance of at least about three quarters to three inches between centers. The distance between keys is measured from a top portion of the key, and not from a portion substantially recessed below the top portion.

Each key may be coded by color, shape or other graphic symbol, and may also be coded by texture. The keys are preferably of the type requiring mechanical movement for activation, although a "touch screen" type keyboard is also contemplated by the inventor. Mechanically actuated keys preferably have a depression stroke of at least 1 millimeter, and preferably two to five millimeters. In addition, the keys preferably have tactile feedback, as known in the art. Audible feedback may also be provided, either through a mechanical feedback mechanism associated with the keyboard or key structure, a separate electronic mechanism in the keyboard, or through software in the personal computer to which the keyboard is attached. The keyboard adapter may also include a pointing device such as a joystick, trackball, or track cylinder, which may be interfaced to the computer through a common or a separate cable in standard manner.

The simplified keyboard, if a separate electrical device, preferably includes a keyboard port passthrough system, so that a signal from a standard keyboard interface may be supplemented by signals from the simplified keyboard. In one embodiment, the simplified keyboard produces codes which correspond to standard alphanumeric characters present on a standard keyboard. In another embodiment, the codes produced by the simplified keyboard are obscure codes not normally generated by standard keyboards during use, for example, not represented by the normal, shifted, controlled or alternate two-key combinations from a standard PC-AT style keyboard. Further, the simplified keyboard may also produce a series of codes from a single depression, or may modify codes from the standard keyboard to alter their effect or to avoid conflicts. In the case of Apple ADB keyboards, a separate "mapping" of codes may be provided to distinguish between the keyboards. In addition to distinguishing single byte sources of codes, as with IBM-PC XT, AT or PS/2 compatible keyboard devices, the simplified keyboard may also produce a unique sequence of codes, preferably a sequence which is not normally accessible from the keyboard, such as FF hexadecimal, which may be followed by other codes to differentiate the various keys of the simplified keyboard.

It is therefore an object according to the present invention to provide a simplified keyboard, having a key type, number and organization optimized for use by young children.

It is a further object according to the present invention to provide a keyboard for a standard-type personal computer having a reduced number of large, spaced keys, which are labelled by color, shape, graphic and/or texture.

It is a still further object according to the present invention to provide a keyboard with a simplified arrangement for use in conjunction with a standard alphanumeric keyboard.

It is another object according to the present invention to provide a keyboard having keys which have a plurality of different shapes, e.g., triangle, square, rectangle, round, crescent, star, cross, octagon, rhombus, doughnut and animal bust shapes, along with directional indicators and an "enter" (or "go") key.

These and further objects will become apparent through a review of the drawings and the detailed description of the preferred embodiments.

BRIEF DESCRIPTION OF THE FIGURES

The invention will be described by way of drawings of the figures, in which.

DETAILED DESCRIPTION OF THE PREFERRED EMBODIMENTS

The present simplified keyboard is designed to facilitate interaction, especially educational interaction, between a young child and a computer. As such, the simplified keyboard arrangement is not optimized for efficient general purpose data entry by normal adults. Thus, the arrangement of the keys need not, nor should not, conform to data entry keyboard standards. Young children may have reduced coordination as compared with normal adults, relating to the task of depressing keys, and therefore the key size and spacing should be increased, and feedback (either mechanical or software driven) is preferably provided as visual, audible or tactile signals.

The present keyboard may be used with standard software—i.e., software for a standard keyboard—especially where the codes available from the simplified keyboard are sufficient to interact with the computer. In addition, where a standard keyboard is also available for use, it may also be used in appropriate circumstances to interact with the computer.

With respect to arithmetic educational software, a simplified keyboard having numeric keys with functions and "enter" or "equals" may be sufficient to make the necessary computer entries. Of course, the key arrangement should be according to the present principles. The present keyboard, when applied to arithmetic functions, differs from available modular numeric keypads in that the key size, spacing and arrangement differs in important ways. Available numeric keypads are designed to facilitate efficient numeric entry by normal adults with one hand. Thus, they are generally designed as a 5×4 matrix of closely spaced square keys, on 0.5–0.75 inch centers (horizontally), with upwardly tapering caps so that the clearance between keys is greater at the surface than approximately 3 mm below the key surface. Such an arrangement may not be optimal for children, and rather a more spaced apart, more oblong arrangement is preferred according to the present invention.

In order to complete the task of entering a desired number, a young child must search the matrix for a desired key, and depress a desired key without accidentally depressing a neighboring key. The tight, approximately square matrix of numeric and operator keys is difficult for young children to navigate, and increases a search time to find and depress a desired key. In contrast, the present arrangement allows a lateral scan of the keyboard keys in a limited number of passes, e.g., one pass, allows identification of the desired key by one or more cues which are readily identifiable by a child, and may be accurately and selectively depressed while encouraging the development of coordination, without simultaneously mandating a high degree of mental functioning and physical dexterity.

It is noted that the simplified keyboard according to the present invention may also be useful for persons having disabilities which impair the ability to use a standard keyboard.

Thus, a keyboard according to the present invention should preferably have an elongated matrix array, to allow the child to visually scan the keys with a small number of passes. A child can scan one to three rows of keys in a single visual pass, especially if the keys are staggered, i.e. not aligned along a vertical axis. Thus, the child's head will be approximately 8–12 inches from the keyboard. The expected vertical field of view in which keys are located is approximately 4–30 degrees, preferably about 10 degrees, and thus the vertical spacing of the keys should be such that two vertically adjacent rows of keys are within view, i.e., between about 1–4 inches. Likewise, in order to allow evaluation of a small number of key identities at a time, the key centers should be spaced horizontally by about between 1 and 4 inches. It is noted that the horizontal field of view is generally larger than the vertical field of view. Further, by providing a separation of the keys along the horizontal axis to provide a spread out array, the child is encouraged to use both hands and the spacing between keys is made large enough to avoid accidental depression of neighboring keys. The keyboard will thus permit "touch typing" as well as single-finger "hunt and peck" operation.

The keys are sized to be large enough so that a child in front of the keyboard is unlikely to miss actuating the key with his finger, yet small enough so that manual dexterity with use of the index fingers is encouraged.

The keys may be coded in any manner cognizable to a child, such as shapes, colors, textures, size, or various combinations of characteristics. The key legends may also be provided by liquid crystal graphic displays, allowing customization by software. The liquid crystal graphic display may form a portion of the key cap, or be a part of the keyboard, such as a strip between adjacent rows of keys.

It is possible to include a touch sensitive surface in the keyboard; however, it is preferred that input keys be provided having a travel in excess of 1 mm be provided to provide a keyboard "feel". A touch sensitive surface may be superimposed on a display surface, or be a separate area. If a touch sensitive surface is provided, this surface is preferably provided for acquiring dynamic input, such as drawings, a swipe, or other physical action requiring coordination of the child. The touch sensitive surface may interface through the keyboard port, such as by mapping the touch sequence as a series of cursor key movements, or through a separate input port, such as a standard serial port. In addition to a touch sensitive surface, a digitizer, mouse, trackball or joystick element may also or alternatively be provided in conjunction with the simplified keyboard, interfacing through the keyboard port or another type of port.

A preferred keyboard arrangement has a membrane layer which prevents dirt, food, liquids and the like from entering the electrical workings of the keyboard. The membrane layer, which may be a replaceable polymer overlay, provides an opportunity for customization, allowing the shape, color and labeling of the keys to be modified. The membrane layer may also be below the keys, preventing debris from contaminating the inner workings of the keyboard.

The electrical switches actuated by the simplified keyboard arrangement according to the present invention operate in known manner. In particular, a standard-type PC keyboard generally has a capacitive sensing key array. Other types of known manual input devices, adaptable for use with the simplified keyboard arrangement include rubber dome, membrane with mechanical keys, force sensing resistors, optical sensors, touch sensitive array (acoustic wave, resistive, capacitive, etc.) and the like.

Further, the simplified keyboard arrangement may also include a joystick, trackball, force sensing resistor-based pointing device, or other known directional input device. These other devices, as stated above, may have outputs which are mapped to keycodes and transmitted through the keyboard port to the computer, or be transmitted to the computer through a different port, such as a serial, parallel, SCSI, joystick, or other port type.

Advantageously, if such other devices are of standard type, they interface through a standard port for that type of interface. Thus, while trackball movements may be transmitted through cursor movement codes or other keycodes, since trackballs by convention are interfaced through a standard serial port on an IBM compatible personal computer, an integral trackball on a simplified keyboard preferably communicates with the computer through the standard serial port.

The simplified keyboard arrangement is preferably interfaced to the standard-type personal computer through a bit-serial port, e.g., keyboard port of an IBM-PC XT, AT or PS/2 compatible computer, See Kersey, Roger M., *Personal Computer Operation and Troubleshooting*, Prentice Hall, Englewood Cliffs, N.J. (1989), pages 208, 212–220, expressly incorporated herein by reference, or an Apple Desktop Bus (ADB) port of an Apple Macintosh or Power PC computer. This is especially so if the simplified keyboard arrangement exists as an adapter for a standard-type keyboard. However, a simplified keyboard arrangement may interface with another type of communication port, e.g., a standard RS-232, RS-423, RS-485, etc. serial port, through a 25 pin D, 9 pin D, 5 pin DIN, PS/2 keyboard port, RJ-11, RJ-45 or other connector, as are known in the art. The use of a bidirectional serial port allows bidirectional communication between the keyboard and computer to allow customization of the keyboard functionality. It is also known to program keyboards using key sequences in a programming mode. The use of a standard serial port also allows the standard keyboard to be connected directly to the computer without modification or interruption of the standard components of the computer, and allows connection to systems without an available or accessible keyboard port, e.g., many portable computers.

In the case of connection to a standard serial port, the format of codes provided by the keyboard may be of any type, although TTY-type codes are preferred. In the case of connection to a standard keyboard port, the communication protocols are defined by the standard computer system, and the simplified keyboard arrangement conforms to the expected signals of the system. For example, a Pilot EZ1000 from Rosetta Technologies, West Vancouver BC, discussed above, may be used to provide an electronic interface for the keyboard. See Electronic Products, December 1993, pages 43–44, expressly incorporated herein by reference.

Figure 12:
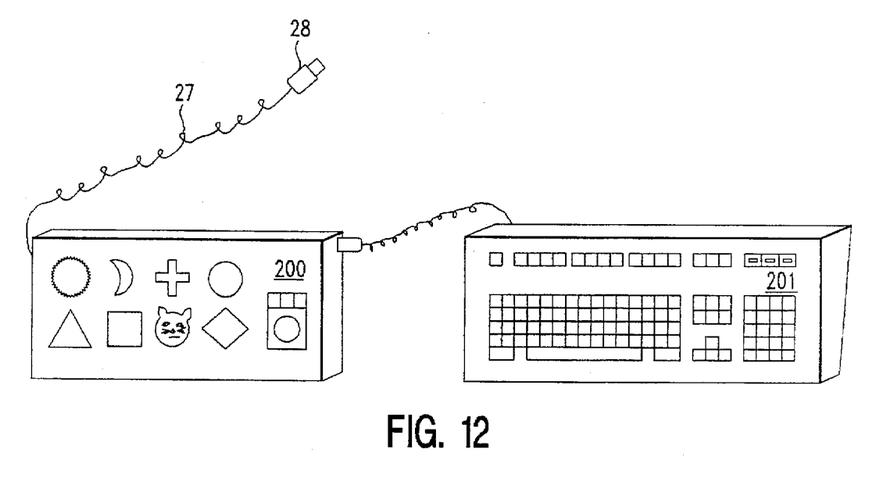
FIG. 12 shows two keyboards, a simplified keyboard and a standard keyboard, connected in daisy chain fashion.

The present system may also include a "Y" adapter which allows connection of multiple keyboards to a standard keyboard port, such as a standard keyboard and a simplified keyboard. Such an arrangement is shown in FIG. 12. In this case, the adapter may be a so-called "A-B switch", which allows signals from alternate input sources to pass in one direction only: the direction toward the computer. The adapter may also be an active device which effectively daisy chains the keyboards, such as by employing the Rosetta EZ1000 device. It is noted that such an adapter is not limited to use with a simplified keyboard, and may be employed wherever multiple keyboard inputs are desired.

When the simplified keyboard is daisychained with a standard keyboard, without an external adapter, as shown in FIG. 12, it is preferred that the standard keyboard signals be read by a controller in the simplified keyboard and retransmitted to the personal computer with any additional codes from the simplified keyboard. This system avoids collisions between the signals from the standard and simplified keyboards, and prevents lost information. Of course, the simplified keyboard may also have an integral "A-B switch" to select input from the simplified keyboard or another keyboard.

Figure 4:
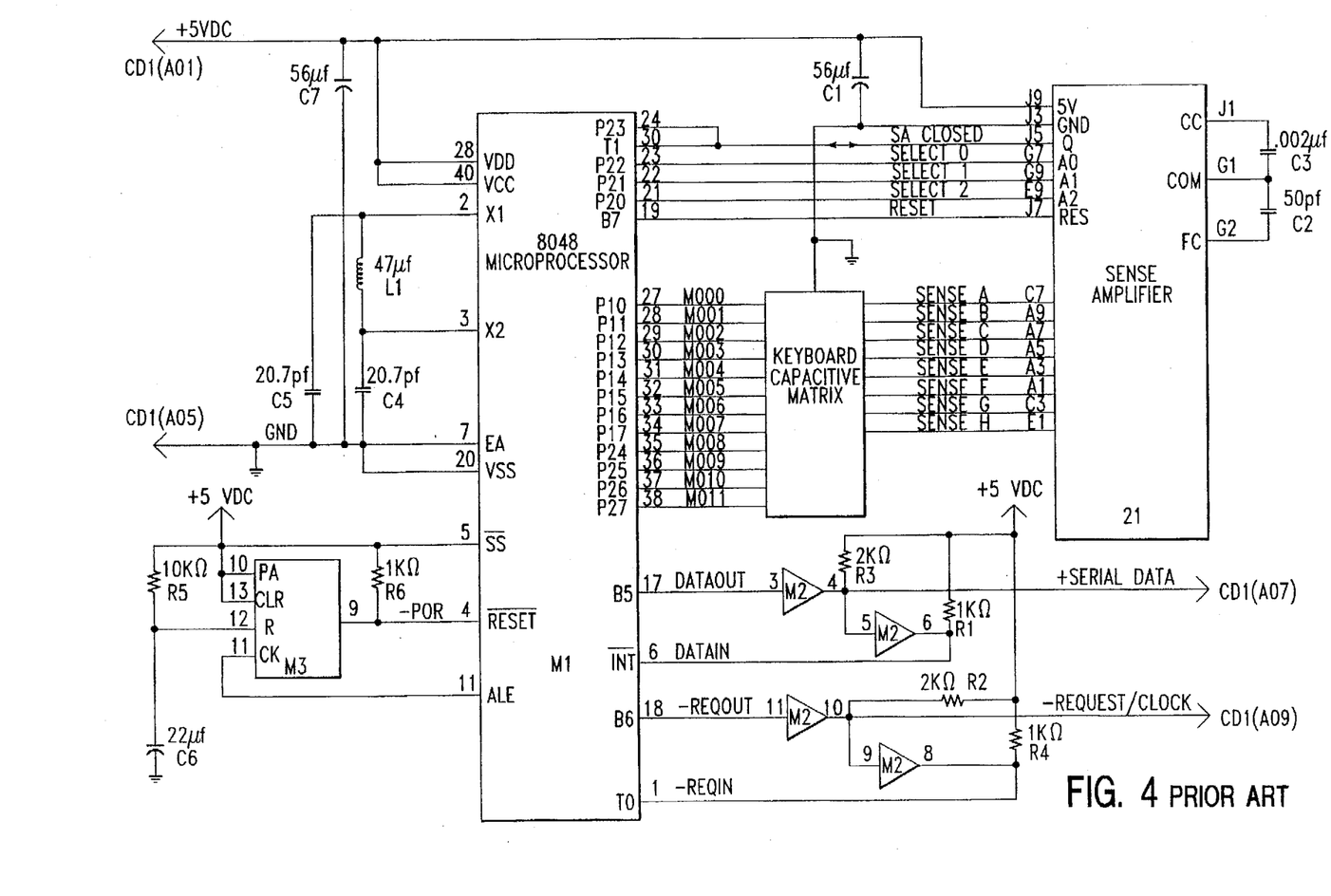
FIG. 4 shows a schematic view of a keyboard circuit according to the present invention.
Figure 5:
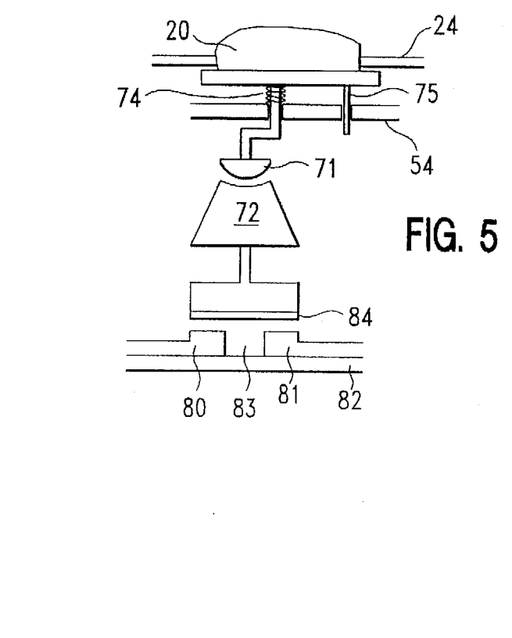
FIG. 5 shows a partial cutaway side view of a simplified keyboard adapter according to the present invention in conjunction with a standard-type capacitive sensing keyboard.

The simplified keyboard arrangement may also have a polled matrix-type sensing matrix to determine which key is depressed. This sensing matrix is controlled by a circuit, which may be a dedicated circuit, a microcontroller, a microcomputer or discrete logic, as is known in the art. Such a prior art circuit is shown in FIG. 4. A capacitive key arrangement, of a standard type keyboard with a simplified keyboard adapter arrangement is shown in FIG. 5.

The electrical connection between the simplified keyboard arrangement and the standard-type computer is preferably though a multiwire cable with a connector of standard type to interface with the standard-type computer. The simplified keyboard arrangement may also include a passthrough connector for connecting a standard-type keyboard simultaneously, as discussed above. This passthrough connector is linked through the simplified keyboard arrangement controller to provide the signals from the standard-type keyboard to the standard-type computer. In certain instances, it may be preferable to filter out or modify certain codes from the data stream from the standard-type keyboard, e.g., a reset command, to avoid disruption of computer use.

In an alternative embodiment, a wireless link may be provided between the simplified keyboard arrangement and the standard-type computer. Such wireless communication, which may be by RF, microwave, magnetic field, infrared, optical, acoustic, or other means, is known in the art. Various methods may be employed for communication, such as AM, FM, PSK, DSPK, QAM, VSB, spread spectrum, and other known techniques. For example, the IBM PC-Jr. computer employed an infrared wireless keyboard. A preferred wireless communication method provides an infrared transmitter on a rear aspect of the simplified keyboard and an infrared receiver placed accessibly in front of the computer. The wireless receiver may be interfaced with the keyboard port or another port of the computer. The link between the standard keyboard and simplified keyboard may also be wireless, with a physical link between the simplified keyboard and the computer keyboard port.

In the case of a hard connection, a standard coiled keyboard cable may be provided, or other cable standard, such as RJ-11, RJ-45, coaxial, multifilament round, fiber optic, or the like.

The simplified keyboard arrangement preferably has an approximate size of between 3 and 8 inches in depth by 9–20 inches in width, with a preferred aspect ratio of between 1.5–6:1 (width:depth). A particular preferred aspect ratio is the so-called "golden ratio", about 1.618, the value which satisfies the equation $phi=1/(phi-1)$. The golden ratio gives a rectangle which is pleasing to the eye. This ratio may also apply to the aspect ratio of the keys in the housing, rather than to the housing itself. Very large keyboards are also contemplated by the inventor. The simplified keyboard preferably has a height of between about 0.5–3 inches. The corners are preferably rounded with a radius of between $\frac{1}{16}$–1 inch. The preferred keyboard is rigid, with a resilient, impact absorbing layer. This impact absorbing layer reduces damage from droppage, and also reduces injuries from use of the keyboard as a "weapon" by a child. Of course, if the simplified keyboard arrangement is provided as an attachment for a standard-type keyboard, the dimensions and materials of the underlying electrical keyboard are selected by others. In this instance, the added height from the simplified keyboard arrangement adapter should preferably be no more than 1.5 inches.

EXAMPLE 1

Figure 1:
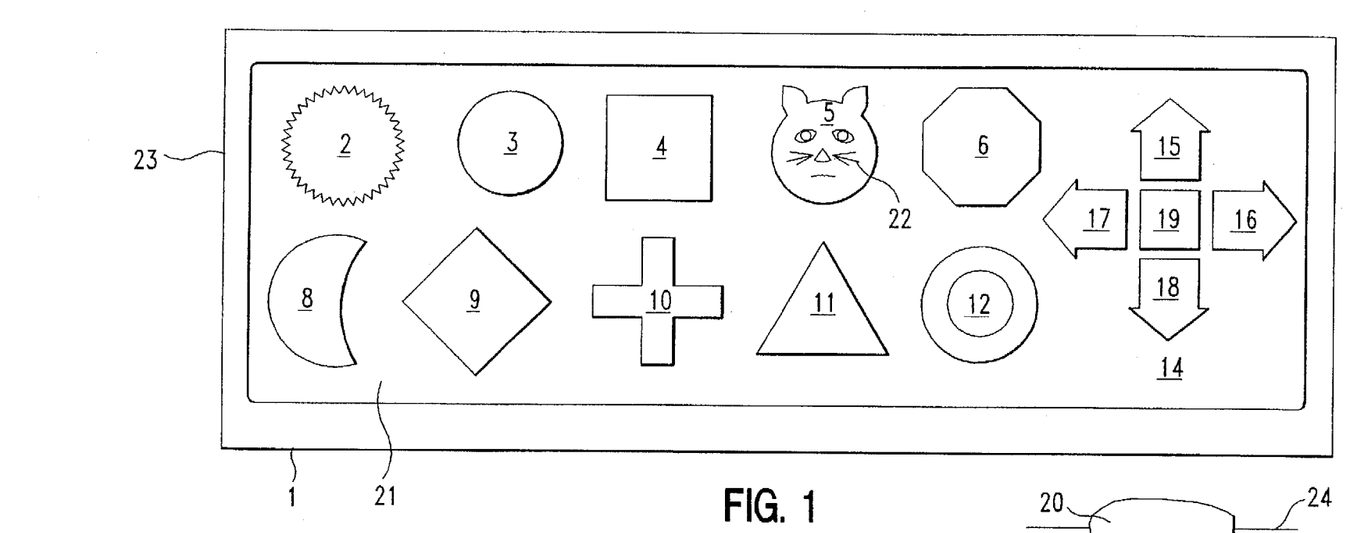
FIG. 1 shows a top view of a simplified keyboard according to the present invention.
Figure 2:
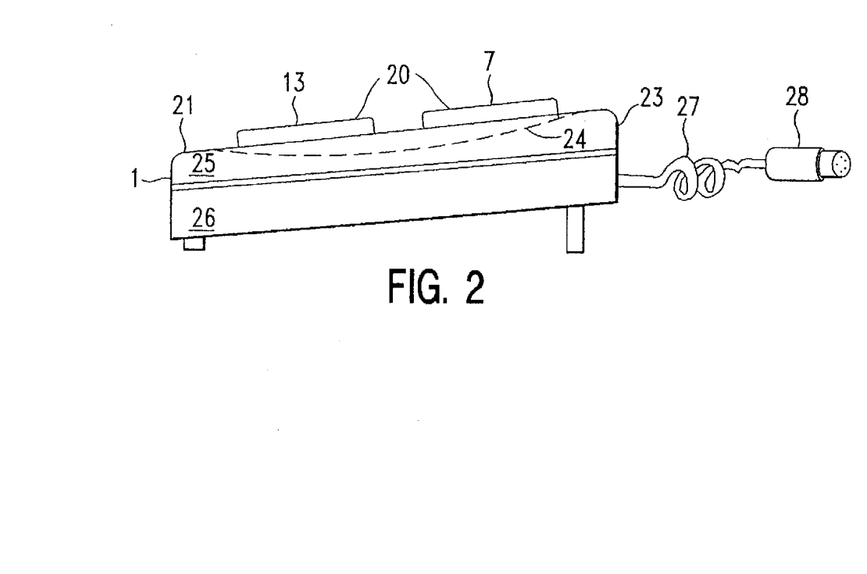
FIG. 2 shows a side view of the keyboard of FIG. 1.
Figure 3:
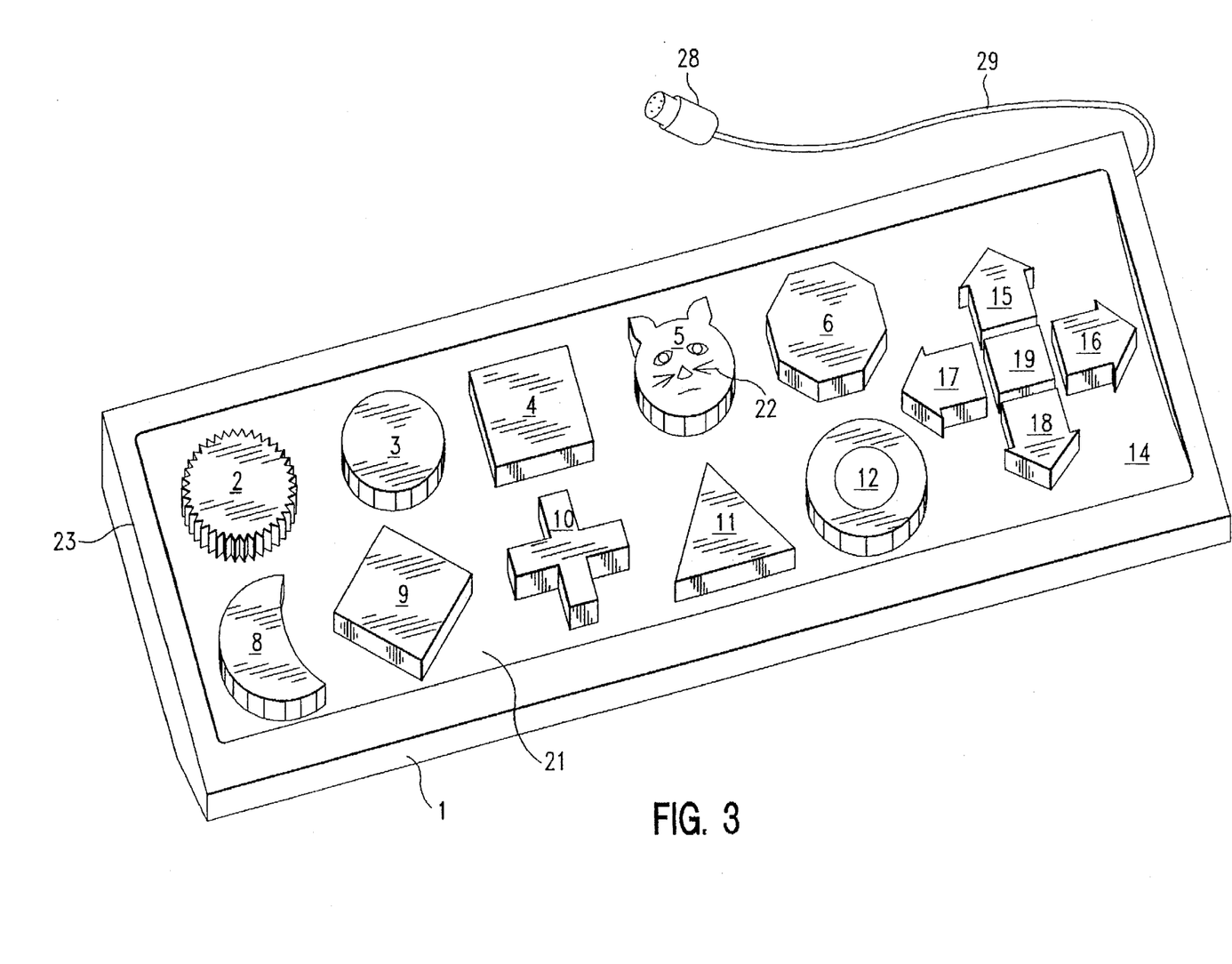
FIG. 3 shows a perspective view of the keyboard of FIG. 1.

As shown in FIGS. 1, 2 and 3, the first embodiment of a simplified keyboard arrangement 1 according to the present invention provides an arrangement of keys with two rows of five shaped and colored keys. These keys have the shapes of a star 2, circle 3, square 4, animal head 5, octagon 6, in a first row 7, and crescent 8, diamond 9, cross 10, triangle 11, and doughnut or torus 12 on a second row 13. On a right lateral portion 14 of the keyboard 1 is a cursor control section having arrows facing up 15, right 16, left 17 and down 18. In the center of the cursor control section is a "go" or "enter" key 19.

The keys tops 20 are formed of a resilient material, and do not have sharp edges. Each key has a different color, e.g., black, white, red, orange, yellow, green, blue, violet, brown, silver, copper, gold, each of which preferably differs from the color of the top surface of the keyboard 21. The cursor keys 15, 16, 17, 18 may be of the same or different colors, with the "go" or "enter" key 19 of a contrasting color. Optionally, the tops of the keys 20 may include a textured material, e.g., gel, fur, sandpaper, steel, fabric, cotton, scales, wood, tacky (e.g., polydiphenylsiloxane-type or coated polymer) and oily (preferably a non-toxic silicone oil leaching silicone polymer). Of course, other textures are known and may be used.

Each key may also include a graphic legend 22, which is preferably molded into the key if the upper surface so allows, which may be a pictogram or alphanumeric character, although it is not intended that a full set of alphanumeric characters, other than possibly digits, be presented.

The keys extend upwardly from a housing 23, as shown in FIG. 2, having a surface 24 with has a slight concave curvature along a horizontal axis, as shown in FIG. 3. The key tops 20 extend about ⅜ inch above this surface 24. The keys preferably have a travel of about 3 mm and are provided with audible and tactile feedback by means of a metal dome under each key, not shown, or by software driven sounds produced by the computer loudspeaker.

The keyboard is formed of a rigid thermoplastic housing, having an upper shell half 25 and a lower shell half 26, between which a circuit board, not shown, resides. The circuit board includes all of the necessary circuitry for determining a key depression and transmitting an appropriate code to an IBM-PC AT or compatible computer, as known in the art. The keyboard has a coiled cable 27, as shown in FIG. 2, or an uncoiled cable 29, which extends from the rear, terminating in a standard 5 pin DIN keyboard connector 28 for an IBM PC-compatible computer. Of course, the circuitry may also be compatible with the standard ADB connector for an Apple Macintosh or Power PC computer.

The housing 1 has a width of 15 inches and a depth of 6 inches. The top of the keyboard slopes, having a height of about 1.25 inches in the front and 1.75 inches in the rear. The keys in the two rows of five are each approximately 1.25 inches in diameter, and spaced about two inches between centers in both a horizontal and vertical axis, offset to the left side of the keyboard. On the right side of the keyboard, the cursor movement arrangement is provided, with arrows approximately 1.5 inches long spaced approximately 0.25 inch from an "enter" key which is about one inch square with a dome-shaped top, extending about 0.25 inch above the cursor keys.

EXAMPLE 2

A simplified keyboard arrangement adapter is provided which snaps over a standard IBM-PC AT 101 key keyboard, e.g., Global Computer Supplies, Stock No. AC9405, or an Apple Macintosh keyboard. The adapter, shown in FIG. 6, has a pair of latches 50, 51, which are spring loaded to be inwardly displaceable. These latches are depressed by inwardly depressing a button 53, and inserted in a gap between the lateralmost keys on either side of the key matrix of the standard keyboard and the plastic housing. The spring loaded latches are then released, holding the adapter in place on a keyboard. The present adapter covers all of the keys, including the alphanumeric keys, function keys, cursor-control keys and numeric keys of the keyboard. However, this latching adapter arrangement may also be employed to selectively cover only a discrete bounded portion of the keyboard, e.g., the alphanumeric keys only.

Figure 6:
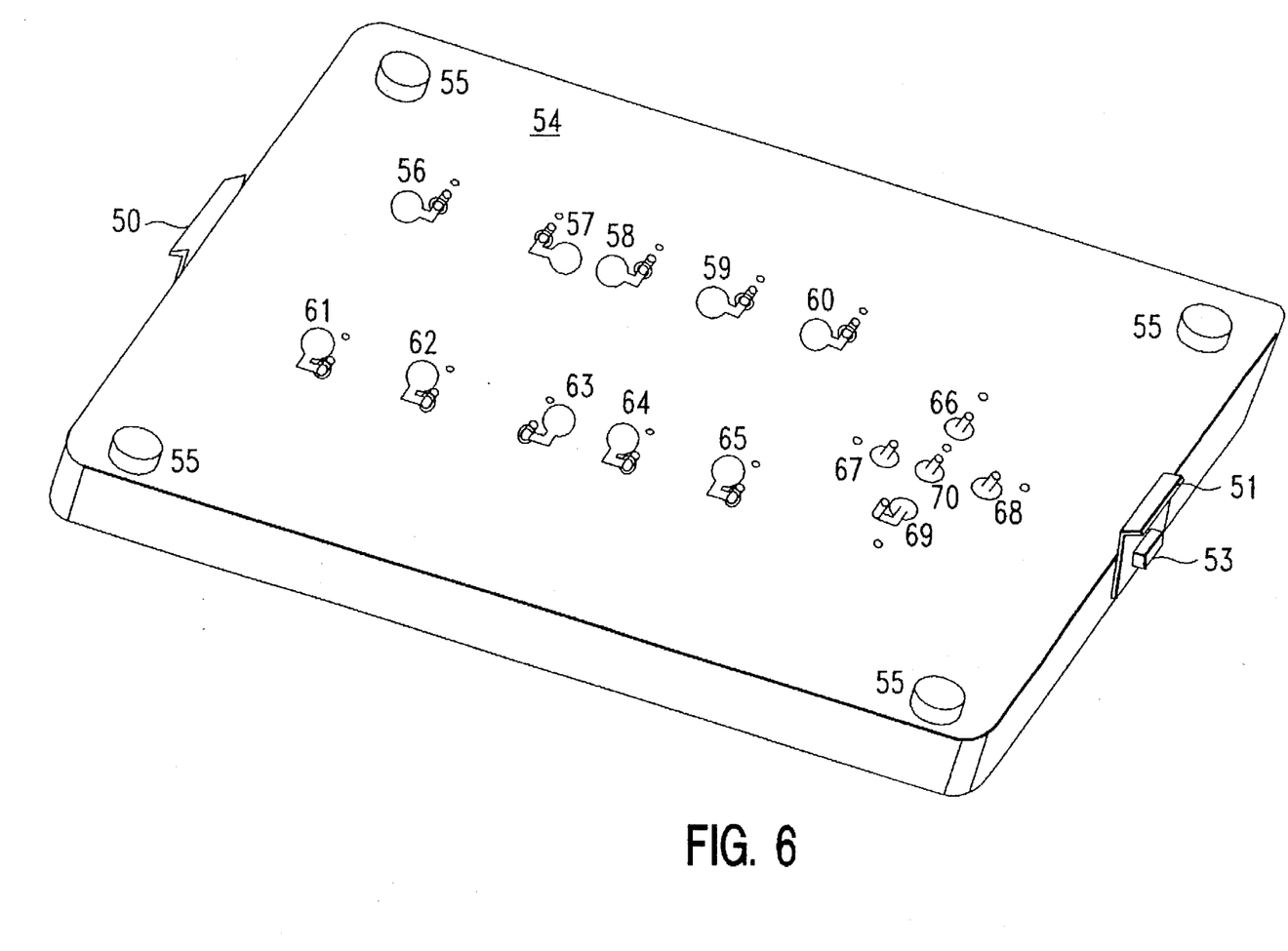
FIG. 6 shows a perspective view of a lower aspect of a simplified keyboard adapter arrangement according to the present invention.

The adapter 54 rests on the standard keyboard with resilient pads 55.

The upper aspect of the adapter is generally as described in example 1. However, instead of being directly linked to a keyswitch in a polled matrix, the adapter has, on its lower aspect, an array of displaceable members 56, 57, 58, 59, 60, 61, 62, 63, 64, 65, 66, 67, 68, 69 and 70, each of which correspond to displaceable member 71 shown in FIG. 5. Each displaceable member is linked to one of the keys on the upper surface. When depressed, a key of the simplified keyboard arrangement directly displaces one of the displaceable members, which is aligned with a selected key 72 on the standard keyboard. The simplified keyboard provides additional key travel of about 2 mm before the displaceable member 71 contacts the key 72 top. The adapter preferably includes audible and tactile feedback element which is a snap-action spring 74, designed to click with a key depression of about 3.5 mm, with a hysteresis which ensures a full depression after a displacement of greater than about 2.5 mm (including the additional key travel provided by the adapter). alternatively, the audible feedback can be produced by the computer software upon detection of a key press.

Each key, in addition to the displaceable member 71, includes an alignment pin 75 to prevent movement except along the axis of displacement.

FIG. 5 also shows a capacitive key switch according to the prior art, including conductive traces 80, 81 on a printed circuit board 82, separated by an insulating zone 83. The key 72 is displaceably linked to a conducive planar surface 84. The change in capacitance when the conductive plane is moved with respect to the conductive traces 80, 81 on the circuit board 83 may be detected by a circuit as shown in FIG. 4. The sensing circuit includes a capacitive matrix 90 defined by the traces 80, 81 and insulating zones 83 on the circuit board 82 below the keys 72. A microprocessor 91 polls the matrix 90. A change in capacitance in any polled key row of is sensed by a sense amplifier 92, which, in turn produces a sense output which is read by the microprocessor 91. The microprocessor 91 transmits the key depression information serially by way of a serial data line 93.

EXAMPLE 3

Figure 7:
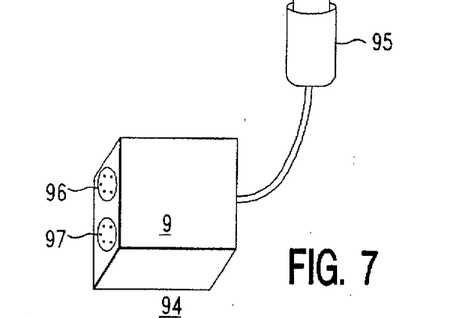
FIG. 7 shows a "Y" keyboard connector according to the present invention.
Figure 11:
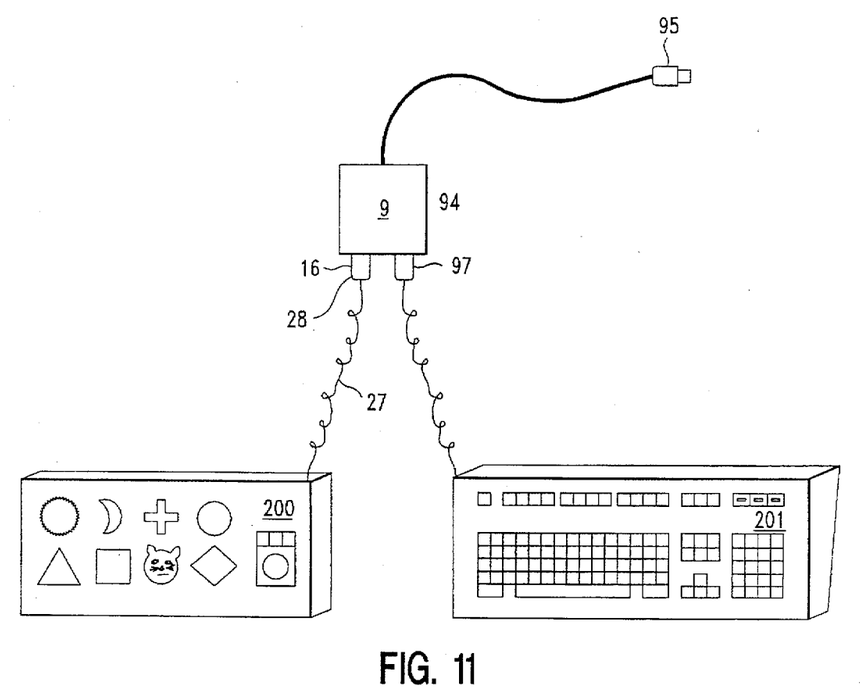
FIG. 11 shows two keyboards, a simplified keyboard and a standard keyboard, connected through a "Y" adapter to a single standard keyboard connector.

As shown in FIGS. 7 and 11, a "Y" adapter 94 is provided which a standard 5 pin male DIN IBM-PC AT compatible keyboard port 95, and a pair of 5 pin female DIN IBM-PC standard keyboard connectors 96, 97. Of course, it is noted that 6 pin mini-DIN IBM PS/2 type keyboard connectors may also be employed. The connectors each lead to a control. The simplified keyboard 200 is interfaced with one keyboard connector 96, and the standard keyboard 201 is interfaced with the connector 97.

Figure 8:
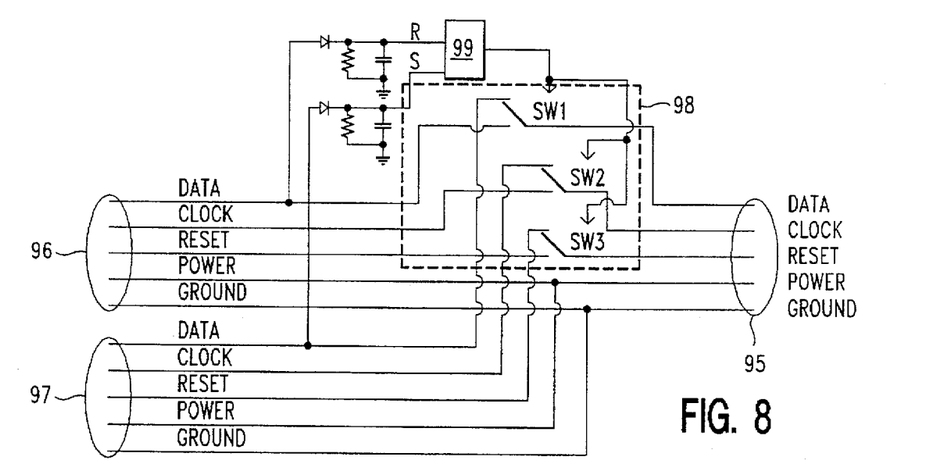
FIG. 8 shows a wiring diagram for a first embodiment of a "Y" connector according to the present invention having an automatic switching system.

Two embodiments are provided for the control. In a first embodiment, shown in FIG. 8, a simple switch system 98, including switches SW1, SW2, SW3 determines which keyboard is active. In general, both the DATA line and the associated CLOCK line must both be switched. The keyboard RESET may be bridged for both keyboards, activated automatically upon switching, or switched with the DATA and CLOCK. POWER and GROUND need not be switched, unless employed to reduce power dissipation of the inactive keyboard. The switches SW1, SW2, SW3 may be mechanical types, or an electronic switch may be employed, such as a CD4053 CMOS multiplexer (3 DPST elements) or equivalent. If an electronic switch is employed, an auto-sensing arrangement may also be provided to automatically connect the keyboard which is actively producing key depression codes, i.e., transitions on the DATA line, at any given time. Priority may be given to one of the keyboards in case of contention by means of simple logic, e.g., a settable/ resettable gate 98.

Figure 9:
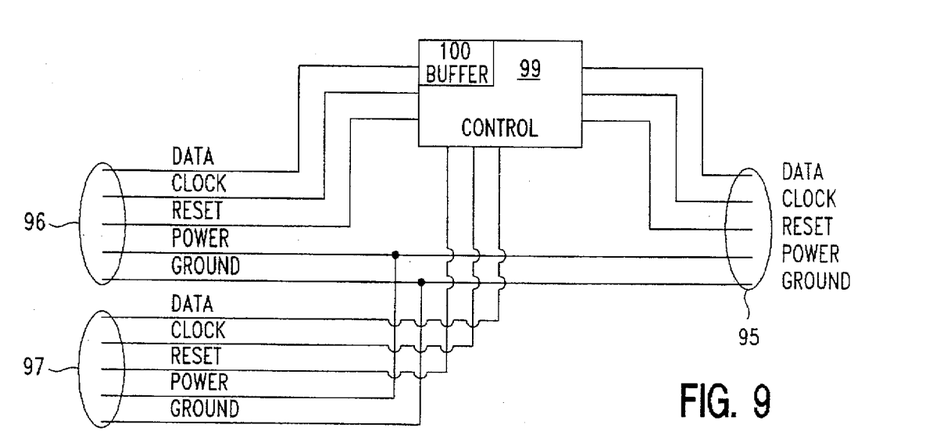
FIG. 9 shows a block diagram for a second embodiment of a "Y" connector according to the present invention having a daisy chain control.

In a second embodiment, shown in FIG. 9, the control 99 provides a true daisy chain for the DATA signal, and appropriate pass-through of CLOCK and RESET signals. Thus, a buffer 100 is provided to store a key depression code, which is transmitted to the computer. In case of contention, one keycode is transmitted, while the other is stored in the buffer 100 for later transmission or processing. The control 99 may be a simple microcontroller, as known in the art, such as an Intel 8048-type device. When it is likely that both keyboards will be active simultaneously, a daisy chain type control is preferred, due to its better performance.

When the "Y" connector 94 is provided for convenience to alleviate the need for switching cables, the "A-B switch" embodiment is generally sufficient.

The control for the "Y" connector 94 may be included with the simplified keyboard, e.g., within the same housing. This configuration is shown in FIG. 12. Further, the single control may be employed both for keycode generation within the simplified keyboard and daisychain functionality. For example, the Rosetta Pilot EZ1000, Intel 8048 type processor or other known type of controller may be employed. In systems designed for use with the Apple ADB, the ADB standard daisy chain should be employed, using a standard controller for this purpose.

Figure 10:
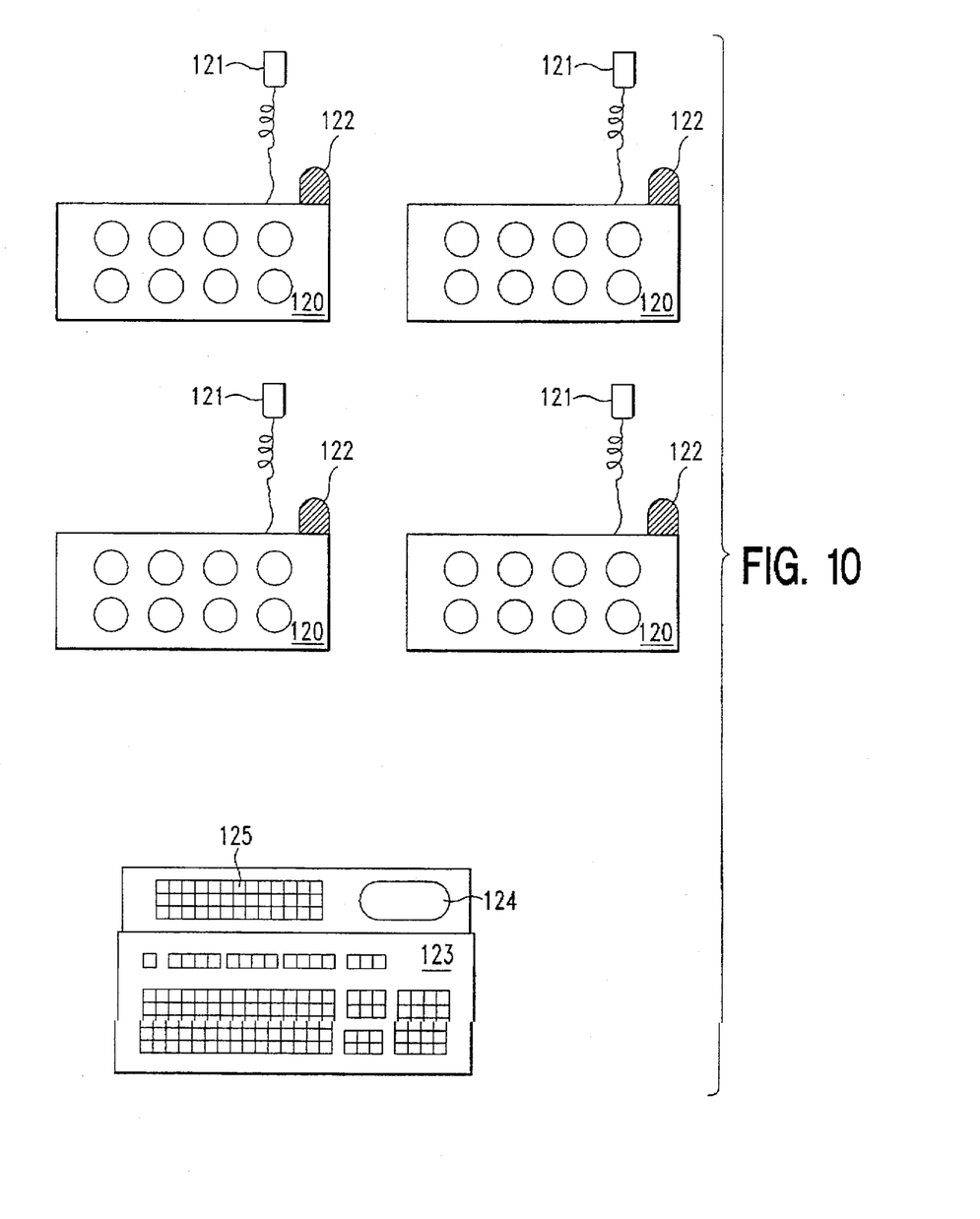
FIG. 10 shows a teacher keyboard with a plurality of student keyboards.

When a daisy chain is employed, both keyboards need not be hard wired to the connector. For example, one or both keyboards may employ a wireless communication scheme. In this case, for example, in an educational environment, the pupil's keyboard 120 may be hard wired to the computer through a cable 121, and include an infrared receiver 122 for detecting input from a teacher's keyboard 123 outfitted with an infrared transmitter 124, sufficient to communicate with each of the pupil's computers 120. The infrared transmission protocol preferably includes an address code to allow selective communication with an individual pupil, while also permitting global communication to the entire room. Selection of pupil may be by means of codes input through the keyboard or through a separate addressing device 125. In this instance, the pupil's keyboard 120 need not be simplified, and in fact may be fully functional.

EXAMPLE 4

Figure 13:
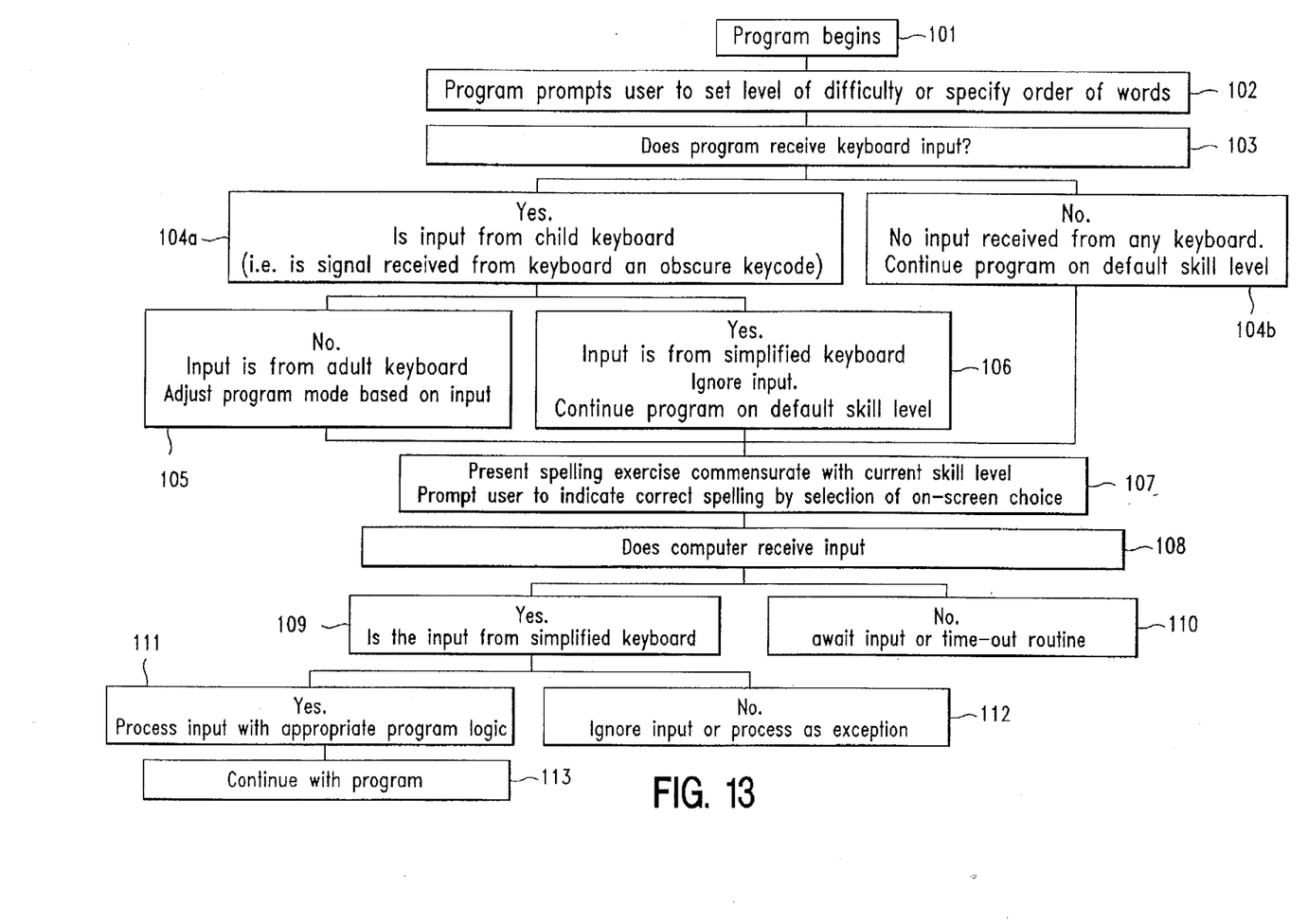
FIG. 13 shows a flow diagram for a system employing a simplified keyboard according to the present invention.

The simplified keyboard is used in conjunction with a standard keyboard as follows. An example application for the simultaneous use of a standard keyboard and a simplified keyboard is in an educational environment, as shown in FIG. 13, such as for teaching spelling.

Initially, the software provided on the computer begins executing the program 101, and prompts the user(s) to input a mode or level of difficulty, or other operational parameters 102. An input is detected 103, and the software then determines the source of the input 104a, 104b. If the response includes standard keycodes, the response is processed directly 105, based on an assumption that the standard keyboard is the source of the codes. If however, the computer receives non-standard keycodes, it is presumed that the input is received from the simplified keyboard 106. Generally, such input parameters as the mode of operation are accepted only from the standard keyboard, so that a failure of response 104b or a response including nonstandard keycodes 106 will result in a default mode setting. Of course, selected responses may be accepted from the simplified keyboard if desired.

After the software is initialized and the mode set, an exercise, such as a spelling exercise is presented 107. At this point, inputs are detected 108, and if received from the simplified keyboard are processed 109, translating the keycodes produced according to the design of the software 111. In general, the standard keyboard will be quiescent during this interval, awaiting an input 110; however, inputs may occur, which are either ignored 112, or processed as supervisory inputs or the like. Software execution then proceeds 113 to present a next exercise.

It should be understood that the preferred embodiments and examples described herein are for illustrative purposes only and are not to be construed as limiting the scope of the present invention, which is properly delineated only in the appended claims.

What is claimed is:

1. A keyboard for use by a child in connection with a computer having a serial data keyboard port, the keyboard being adapted for manual entry of symbolic data, the serial data keyboard port receiving keyscan codes corresponding to a set of characters, the characters including a set of commonly used characters and a set of rarely used characters, the commonly used characters being represented by a single key depression on an adult-type computer keyboard, and the rarely used characters not being represented by a single key depression on an adult-type computer keyboard, comprising;

a keyboard housing having a top surface;

an arrangement of between four and twenty-five keys disposed on the top surface of said housing;

a keyscan system, within the keyboard housing, generating a keyscan code for each of said keys selected from the group consisting of keyscan code corresponding to rarely used characters;

an input for receiving serial data communicated by an adult-type computer keyboard; and an output for communicating the received serial data from the adult-type computer keyboard and serial data relating to a keyscan code corresponding to a depression of one of said arrangement of keys to the serial data keyboard port of the computer.

2. The keyboard according to claim 1, wherein said plurality of keys are arranged in a matrix having an aspect ratio of about 0.14 to 0.75:1 (depth to width).

3. The keyboard according to claim 1, wherein at least one of said input or said output communicated wirelessly.

4. The keyboard according to claim 1, wherein said keys are arranged in a parallelogram matrix.

5. The keyboard according to claim 1, wherein said keys have a size along a lateral axis of between about 0.5 and 2 inches.

6. The keyboard according to claim 1, wherein said keys have a spacing between the edges of the keys of between about 0.375 and 1.5 inches.

7. The keyboard according to claim 1, wherein said keys have a spacing between centers of the keys of between about 1.375 and 4 inches.

8. The keyboard according to claim 1, wherein said keys are each labelled by at least one characteristic selected from the group consisting of color, shape and texture.

9. The keyboard according to claim 8, wherein said keys are labelled with a plurality of characteristics selected from the group consisting of color, shape and texture.

10. The keyboard according to claim 1, wherein depression of at least a portion of the keys produces a feedback signal selected from the group consisting of sound and a tactile vibration.

11. The keyboard according to claim 1, wherein said input data is stored in a buffer for communication through said output.

12. The keyboard according to claim 1, further comprising at least one input device, disposed on the top surface of said housing, for directional control of the cursor.

13. The keyboard according to claim 12, wherein said input device includes a plurality of keys, distinct from said arrangement of between four and twenty-five keys.

14. The keyboard according to claim 12, wherein the input device includes a joystick.

15. The keyboard according to claim 12, wherein the input device is selected from the group consisting of a trackball and a track cylinder.

16. The keyboard according to claim 1, wherein said serial data keyboard port is an IBM-PC XT, AT or PS/2 compatible computer keyboard port.

17. The keyboard according to claim 1, wherein said serial data keyboard port is an Apple ADB compatible port.

18. The keyboard according to claim 1, wherein said adult-type keyboard comprises an alphanumeric keyboard for an IBM-compatible personal computer.

19. An auxiliary keyboard for a computer having a serial keyboard data port, wherein the computer responds to a set of codes transmitted to the serial keyboard data port, the computer having an associated keyboard which generates a subset of the set of codes by depression of any single key on the keyboard, comprising:

an auxiliary keyboard housing having a top surface;

an arrangement of between four and twenty-five keys disposed on the top surface of said housing;

a key press encoding system, within the auxiliary keyboard housing, generating a code for each of said arrangement of keys selected from the group of codes not within the subset of codes generated by depression of a single key on the associated keyboard;

an input for receiving serial data communicated by the associated keyboard; and an output for communicating the received serial data from the associated keyboard and serial data relating to a code corresponding to a depression of one of the arrangement of keys to the serial keyboard data port of the computer.

20. The associated keyboard according to claim 19, wherein depression of at least a portion of said arrangement of keys produces a feedback signal selected from the group consisting of sound and a tactile vibration.

21. The associated keyboard according to claim 19, wherein said received serial data communicated by the associated keyboard is stored in a buffer for communication through said output.

22. The associated keyboard according to claim 19, further comprising at least one input device, dispose on the top surface of said housing, for directional control of a cursor of the computer.

23. The associated keyboard according to claim 22, wherein said input device includes a plurality of keys, distinct from said arrangement of keys.

24. The associated keyboard according to claim 22, wherein the input device comprises a joystick.

25. The associated keyboard according to claim 22, wherein the input device is selected from the group consisting of a trackball and a track cylinder.

26. The associated keyboard according to claim 19, wherein the serial data keyboard port is an IBM-PC XT, AT or PS/2 compatible computer keyboard port.

27. The associated keyboard according to claim 19, wherein the serial data keyboard port is an Apple ADB compatible port.

* * * * *